United States Patent
Stanich et al.

(10) Patent No.: US 11,637,946 B2
(45) Date of Patent: Apr. 25, 2023

(54) ITERATIVE UNIFORMITY COMPENSATION MECHANISM

(71) Applicants: Mikel Stanich, Longmont, CO (US); Nikita Gurudath, Boulder, CO (US); Walter F. Kailey, Frederick, CO (US)

(72) Inventors: Mikel Stanich, Longmont, CO (US); Nikita Gurudath, Boulder, CO (US); Walter F. Kailey, Frederick, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/534,617

(22) Filed: Nov. 24, 2021

(65) Prior Publication Data

US 2022/0083826 A1 Mar. 17, 2022

Related U.S. Application Data

(63) Continuation of application No. 16/995,999, filed on Aug. 18, 2020, now Pat. No. 11,216,710.

(51) Int. Cl.
*H04N 1/60* (2006.01)
*G06K 15/02* (2006.01)
*H04N 1/405* (2006.01)

(52) U.S. Cl.
CPC ......... *H04N 1/6041* (2013.01); *G06K 15/027* (2013.01); *G06K 15/1881* (2013.01); *H04N 1/405* (2013.01); *H04N 1/603* (2013.01)

(58) Field of Classification Search
CPC ............. H04N 1/405–4058; H04N 1/60–6097
See application file for complete search history.

(56) References Cited

U.S. PATENT DOCUMENTS 6,191,867 B1 * 2/2001 Shor .................... H04N 1/4078
358/1.9
6,270,187 B1 8/2001 Murcia et al.
(Continued)

FOREIGN PATENT DOCUMENTS

EP 1197916 A2 4/2002
EP 1157840 B1 7/2007
(Continued)

OTHER PUBLICATIONS

Federal Agencies Digitization Guidelines Initiative, Glossary of Terms (Year: 2009).*
(Continued)

*Primary Examiner* — Barbara D Reinier
(74) *Attorney, Agent, or Firm* — Jaffery Watson Mendonsa & Hamilton LLP (57) ABSTRACT

A printing system is disclosed. The printing system includes at least one physical memory device to store halftone calibration logic and one or more processors coupled with the at least one physical memory device to execute the halftone calibration logic to receive print image measurement data corresponding to a first halftone design associated with each of a plurality of pel forming elements, generate measurement data for each of the pel forming elements based on the print image measurement data, generate a uniformity compensated halftone for each of the pel forming elements based on inverse transfer functions corresponding to each of the pel forming elements and the first halftone design and transmit the uniformity compensated halftone for each of the pel forming elements.

20 Claims, 9 Drawing Sheets

(56) References Cited

U.S. PATENT DOCUMENTS

| | | | |
|---|---|---|---|
| 7,024,126 B2 | 4/2006 | Kellie et al. | |
| 7,289,248 B2 | 10/2007 | Yamazaki | |
| 7,306,312 B2 | 12/2007 | Chiwata | |
| 7,483,171 B2 | 1/2009 | Agar | |
| 8,033,630 B2 | 10/2011 | Miyamoto | |
| 8,157,345 B2 | 4/2012 | Sasayama | |
| 8,251,476 B2 * | 8/2012 | Shin | B41J 2/04588 347/14 |
| 8,322,811 B2 | 12/2012 | Chandu et al. | |
| 8,542,418 B2 | 9/2013 | Chandu et al. | |
| 8,573,731 B2 | 11/2013 | Bastani et al. | |
| 8,699,103 B2 | 4/2014 | Mestha et al. | |
| 8,967,757 B2 | 3/2015 | Bastani et al. | |
| 9,108,402 B2 | 8/2015 | Sudo | |
| 9,302,469 B2 | 4/2016 | De Grijs | |
| 9,463,638 B1 | 10/2016 | Kroon | |
| 9,621,762 B2 | 4/2017 | Chandu et al. | |
| 9,661,154 B1 | 5/2017 | Stanich et al. | |
| 9,914,309 B2 | 3/2018 | Billow | |
| 10,082,990 B2 | 9/2018 | Martin et al. | |
| 10,449,759 B2 | 10/2019 | Trachanas | |
| 10,488,846 B2 | 11/2019 | Donovan | |
| 10,538,106 B2 | 1/2020 | Stritzel | |
| 10,652,433 B2 * | 5/2020 | Nakamura | H04N 1/00015 |
| 11,216,710 B1 | 1/2022 | Stanich | |
| 11,270,171 B2 | 3/2022 | Fukui | |
| 11,281,950 B2 | 3/2022 | Otani | |
| 11,338,591 B1 | 5/2022 | Kailey | |
| 11,368,592 B1 | 6/2022 | Kailey | |
| 2002/0051144 A1 | 5/2002 | Ilbery et al. | |
| 2004/0136013 A1 * | 7/2004 | Mestha | H04N 1/6041 358/1.9 |
| 2005/0099446 A1 | 5/2005 | Mizes et al. | |
| 2005/0243340 A1 | 11/2005 | Tai et al. | |
| 2006/0061782 A1 | 3/2006 | Yao | |
| 2006/0072160 A1 | 4/2006 | Yamazaki | |
| 2007/0115507 A1 | 5/2007 | Terekhov et al. | |
| 2009/0284762 A1 | 11/2009 | Zhang et al. | |
| 2010/0207983 A1 | 8/2010 | Hiroyuki | |
| 2012/0050755 A1 | 3/2012 | Chandu | |
| 2013/0021400 A1 | 1/2013 | Tamagawa | |
| 2013/0076825 A1 | 3/2013 | Szafraniee | |
| 2013/0176600 A1 | 7/2013 | Chandu | |
| 2013/0293611 A1 | 11/2013 | Masashi | |
| 2014/0071191 A1 | 3/2014 | Masashi | |
| 2014/0313255 A1 | 10/2014 | Ukishima | |
| 2015/0062233 A1 | 3/2015 | Ueshima | |
| 2016/0052318 A1 | 2/2016 | Humet Pous | |
| 2016/0100079 A1 | 4/2016 | Gerrits | |
| 2016/0309056 A1 | 10/2016 | Wakui | |
| 2017/0236041 A1 | 8/2017 | Stanich | |
| 2017/0280022 A1 * | 9/2017 | Kuroiwa | H04N 1/00045 |
| 2018/0008995 A1 | 1/2018 | Baker et al. | |
| 2018/0022131 A1 | 1/2018 | Klinger et al. | |
| 2018/0234582 A1 | 8/2018 | Stanich et al. | |
| 2018/0236776 A1 | 8/2018 | Stanich et al. | |
| 2019/0389227 A1 | 12/2019 | Stanich et al. | |
| 2020/0094546 A1 | 3/2020 | Samadzadegan | |
| 2020/0247137 A1 | 8/2020 | Ryosuke et al. | |
| 2021/0339522 A1 | 11/2021 | Shibata | |
| 2022/0083826 A1 | 3/2022 | Stanich | |

FOREIGN PATENT DOCUMENTS

| | | |
|---|---|---|
| JP | 2018-133801 | 8/2018 |
| JP | 2018136941 | 8/2018 |
| WO | 2008059264 A1 | 5/2008 |

OTHER PUBLICATIONS

Hansen et al., "High-Throughput Printing via Microvascular Multinozzle Arrays", Advanced Materials, 25(1), pp. 96-102.

Vantram, S. R. (2014). Fully Automated Calibration Procedure to Compensate Print Non-uniformities Incurred in Fixed Print-head Array Structures. Retrieved from https://jp.ricoh.com/-/Media/Ricoh/Sites/jp_ricoh/technology/techreport/39/pdf/RTR39a18.pdf See highlighted sections.

Office Action for U.S. Appl. No. 17/194,133, 14 pages, dated Jan. 13, 2022.

Extended European Search Report for EP21191026.0, 11 pages, dated Jan. 5, 2022.

Office Action for U.S. Appl. No. 17/193,906, dated Nov. 23, 2021, 16 pages.

International Search Report and Written Opinion for PCT/JP2022/009086, dated Jun. 2, 2022, 12 pages.

International Search Report and Written Opinion for PCT/JP2022/008654, dated Jun. 17, 2022, 15 pages.

Extended European Search Report for EP22159749, dated Jul. 19, 2022, 8 pages.

Notice of Allowance for U.S. Appl. No. 17/193,995, dated Oct. 27, 2022, 21 pages.

* cited by examiner

Figure 1

Figure 2 mult_array(:,:,1) =

254 230 90 16 2 25 82 222
247 214 132 41 8 58 156 189
99 148 181 140 74 123 173 107
33 66 165 206 239 197 115 49
2 25 82 222 255 230 90 16
8 58 156 189 247 214 132 41
74 123 173 107 99 148 181 140
239 197 115 49 33 66 165 206 mult_array(:,:,2) =

252 228 88 14 1 22 80 219
244 211 129 38 5 55 154 186
96 145 178 137 71 121 170 104
30 63 162 203 236 195 112 47
1 22 80 219 252 228 88 14
5 55 154 186 244 211 129 38
71 121 170 104 96 145 178 137
236 195 112 47 30 63 162 203 mult_array(:,:,3) =

ITERATIVE UNIFORMITY COMPENSATION MECHANISM

CROSS-REFERENCE

This application is a continuation of U.S. application Ser. No. 16/995,999, filed Aug. 18, 2020, the entire contents of which are hereby incorporated herein by reference.

FIELD OF THE INVENTION

The invention relates to the field of image reproduction, and in particular, to uniformity correction.

BACKGROUND

When correcting cross-web spatial non-uniformity of a print engine with multiple fixed print heads, relatively large non-uniformities may occur at the junction between the print heads and within a printhead. However, correction of each print head nozzle using interpolated reflectance measurements does not fix this problem since the correction of each nozzle affects the reflectance of nearby locations, and because gaps or overlaps between print head segments are not taken account of when nozzles are independently compensated.

Moreover, fiducial marks at the print head segment boundaries can be used to accurately locate individual nozzles. This facilitates deriving a transfer function for each individual nozzle within a print head, so that the corrections based on measurements precisely centered on each nozzle can be applied to the proper nozzle. Nonetheless, the print head segment boundaries remain uncontrolled, and corrections to nearby nozzles will continue to interact.

Accordingly, a mechanism to perform nozzle uniformity compensation is desired.

SUMMARY

In one embodiment, a printing system is disclosed. The printing system includes at least one physical memory device to store halftone calibration logic and one or more processors coupled with at least one physical memory device to execute the halftone calibration logic to receive print image measurement data corresponding to a first halftone design associated with each of a plurality of pel forming elements, generate measurement data for each of the pel forming elements based on the print image measurement data, generate a uniformity compensated halftone for each of the pel forming elements based on inverse transfer functions corresponding to each of the pel forming elements and the first halftone design and transmit the uniformity compensated halftone for each of the pel forming elements.

In a further embodiment, a method is disclosed. The method includes receiving print image measurement data corresponding to a first halftone design associated with each of a plurality of pel forming elements, generating measurement data for each of the pel forming elements based on the print image measurement data, generating a uniformity compensated halftone for each of the pel forming elements based on inverse transfer functions corresponding to each of the pel forming elements and the first halftone design and transmitting the uniformity compensated halftone for each of the pel forming elements.

BRIEF DESCRIPTION OF THE DRAWINGS

A better understanding of the present invention can be obtained from the following detailed description in conjunction with the following drawings, in which.

DETAILED DESCRIPTION

A uniformity compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
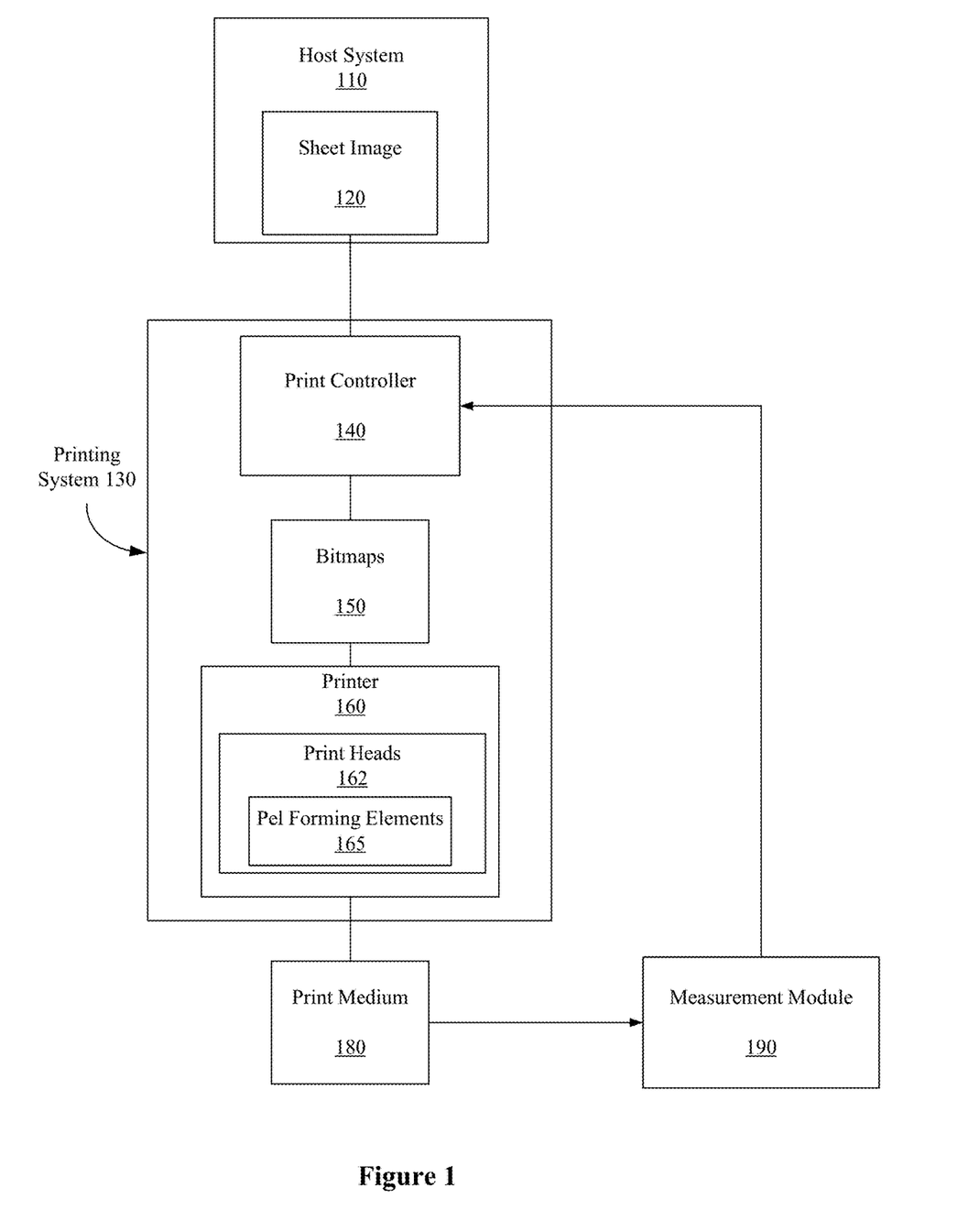
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads. The pel forming elements 165 may be stationary (e.g., as part of a stationary printhead) or moving (e.g., as part of a printhead that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. Bitmap 150 may be a halftoned bitmap (e.g., a calibrated halftone bit map generated from calibrated halftones, or uncalibrated halftone bit map generated from uncalibrated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a halftone calibration system to obtain measurements of the printed medium 180. The measured results are communicated to print controller 140 to be used in the halftone calibration process. The measurement system may be a stand-alone process or be integrated into the printing system 130.

According to one embodiment, measurement module 190 may be a sensor to take measurements of printed images on print medium 180. Measurement module 190 may generate and transmit measurement data 222. Measurement data 222 may be OD (e.g., optical density) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer. In a further embodiment, measurement data 222 may include a map information to correlate OD data to the corresponding pel forming elements 165.

Figure 2:
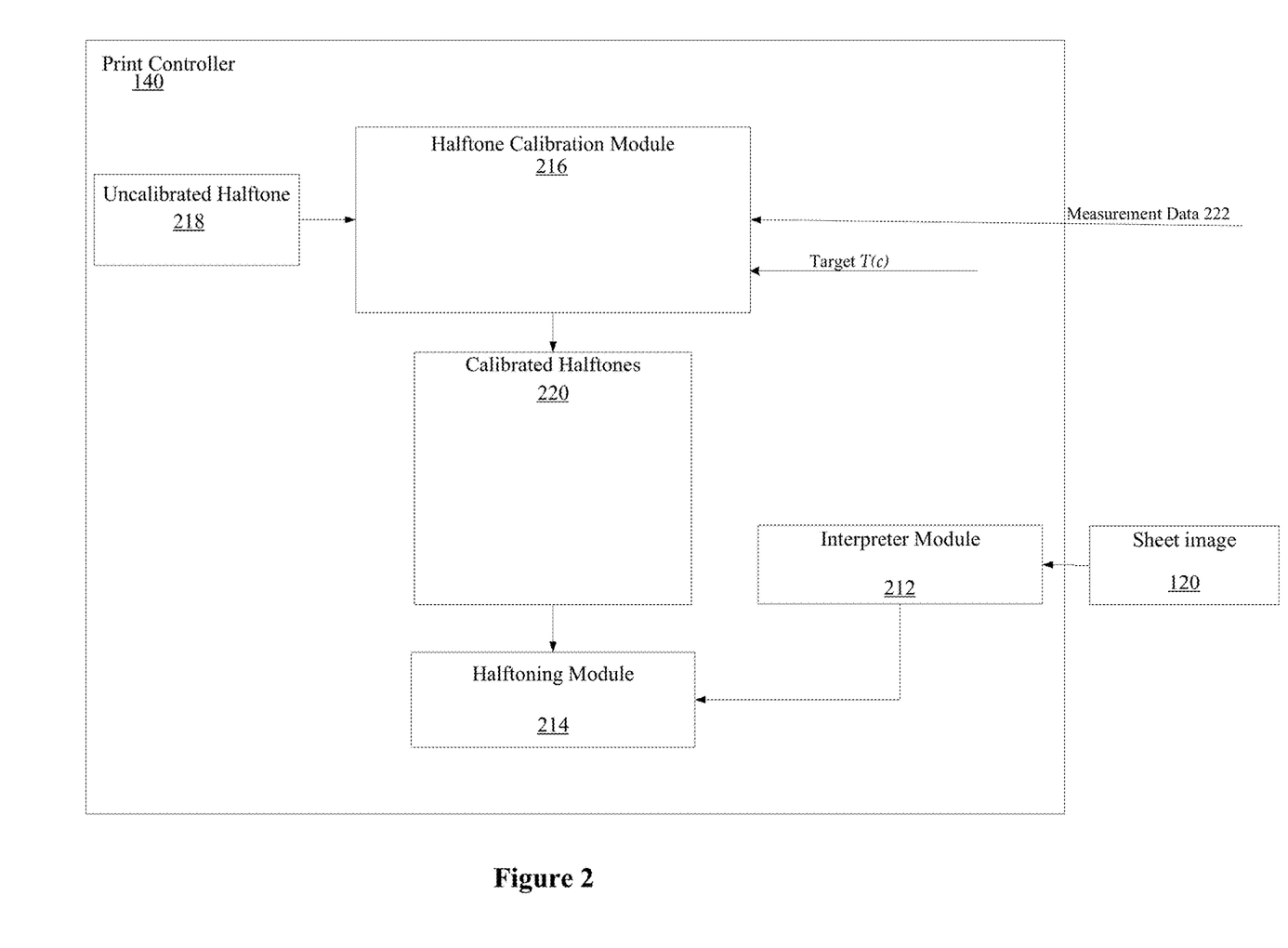
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a halftone calibration module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger drop sizes, beginning with zero and ending with a maximum drop size (e.g., threshold arrays such as single bit threshold arrays or multibit threshold arrays). In another embodiment, the halftone design may include a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. These set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap.

This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Figure 3:
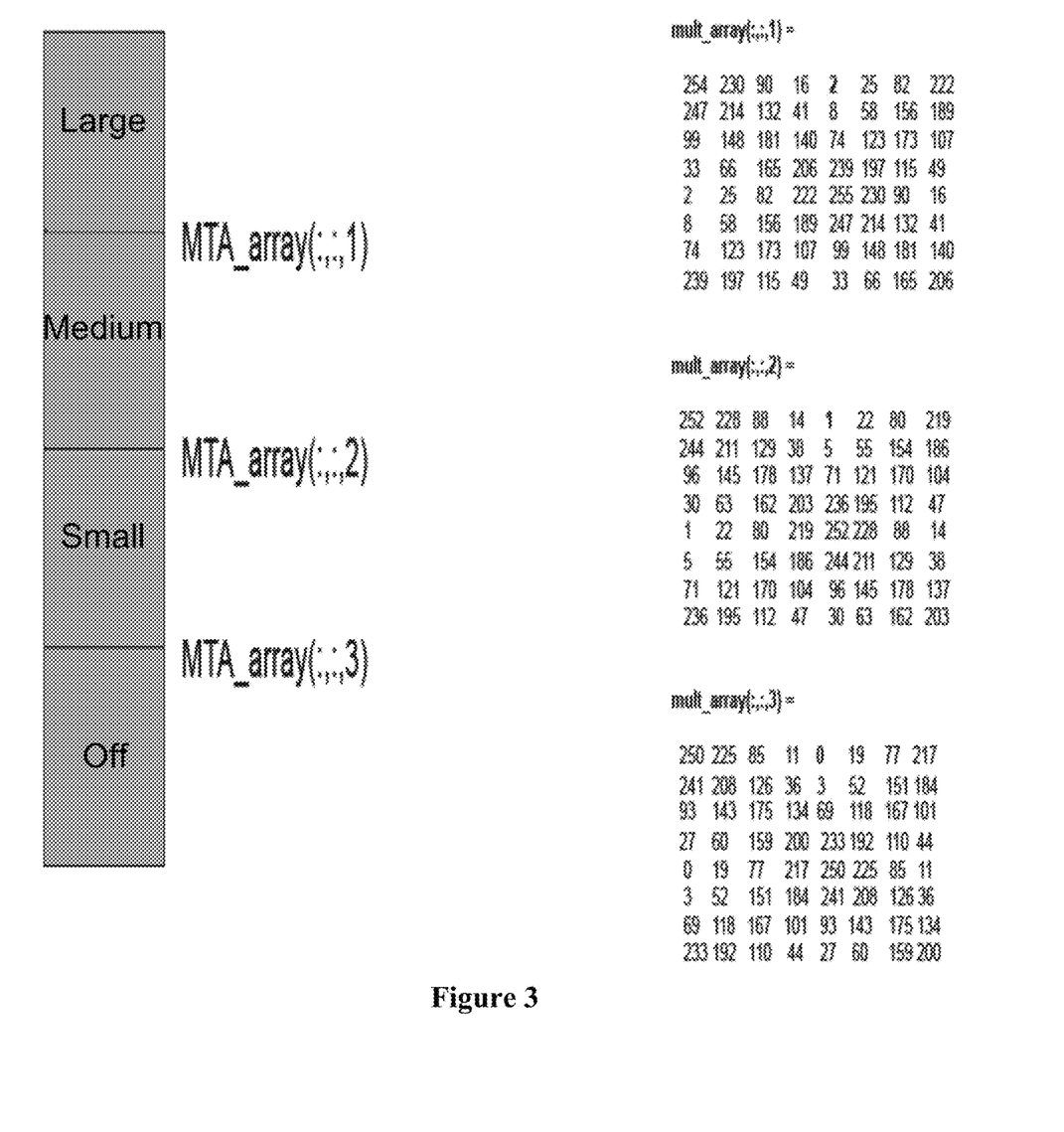
FIG. 3 illustrates one embodiment of multibit halftone designs, where the halftones are described using multi-bit threshold arrays (MTAs)

For multi-bit halftones, as shown in FIG. 3, the MTA is a three-dimensional array including one two-dimensional array for each drop size transition. Thus an MTA includes a set of two-dimensional arrays of thresholds for transition between drop sizes: plane one provides the threshold for the Large output level, while plane 2 and plane 3 provide thresholds for the Medium and Small output levels respectively for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In the case of Large drops, they are produced by the halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined, based on the contone values.

In other embodiments, the number of planes of threshold data can be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Halftone calibration module 216 performs a calibration process on an un-calibrated halftone 218, or previously generated uniformity compensated halftone, received at print controller 140 to generate one or more calibrated halftones 220. Calibrated halftones 220 are then received at halftoning module 214 along with the sheetside bitmap. In one embodiment, an un-calibrated halftone 218 represents a reference halftone design that is modified to create the calibrated halftones. In such an embodiment, measurements of the system response (e.g., measurement data 222) are received via measurement module 190 using the un-calibrated halftone 218 for printing.

According to one embodiment, halftone calibration module 216 performs an iterative process to achieve uniformity compensation of a calibrated halftone. As used herein, uniformity compensation is defined as a calibration to compensate for measured response differences at a single pel, by a pel forming element 165 (e.g., print head nozzle).

In one embodiment, an un-calibrated halftone 218 is initially received at halftone calibration module 216 and is used to generate a uniformity calibrated halftone. Subsequently, an iterative process is performed that results in a generation of refined uniformity calibrated halftones after each iteration in order to improve uniformity, where each iteration compensates for marking differences of pel forming elements 165. In each case the halftone from the previous iteration is used to print the markings that are measured and used to generate the current uniformity compensation data. In other words, the calibrated halftone created for iteration number two is based on measurements of marks printed using the calibrated halftone from iteration number one.

In a further embodiment, the iterative process is completed once a determination is made that optical density (OD) variations for the pel forming elements 165 for a calibrated halftone are less than a predetermined uniformity threshold associated with a target uniformity compensation specification. The uniformity threshold may be received. In yet a further embodiment, a calibrated halftone is saved as a uniformity compensated halftone upon a determination during an iteration that that the OD variations are less than the predetermined threshold.

Figure 4:
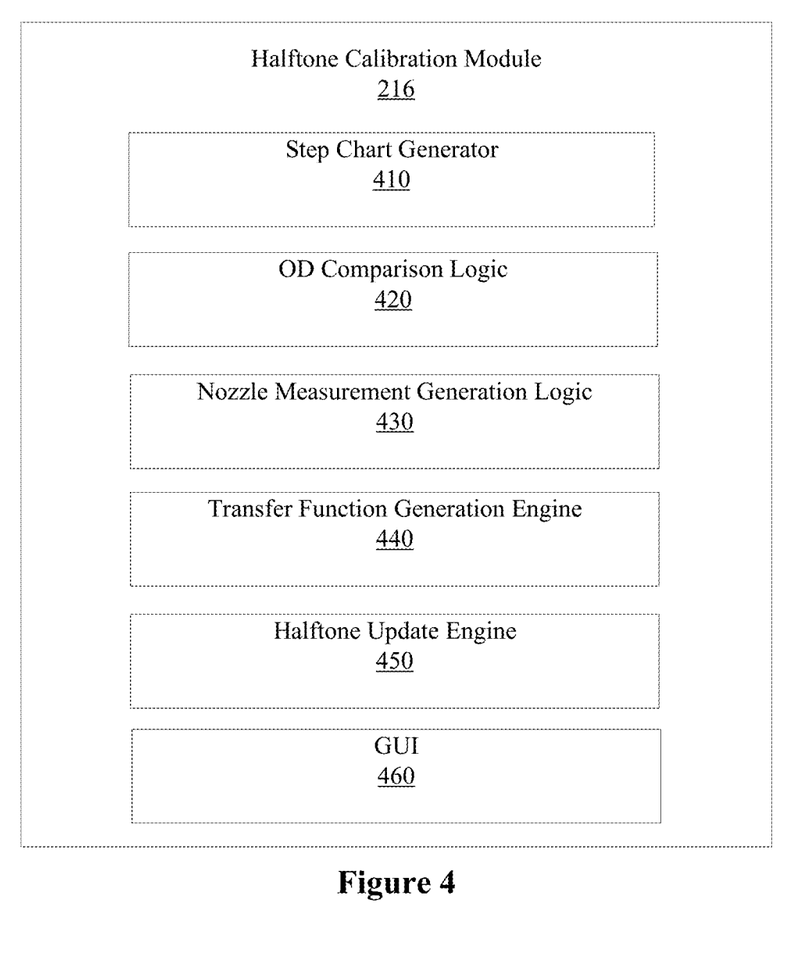
FIG. 4 illustrates one embodiment of halftone calibration module.

FIG. 4 illustrates one embodiment of halftone calibration module 216. As shown in FIG. 4, halftone calibration module 216 includes a step chart generator 410 implemented to print a calibration step chart. In one embodiment, step chart generator 410 generates an initial step chart based on un-calibrated halftone 218. In such an embodiment, the initial step chart uses a threshold array associated with the uncalibrated halftone design to generate the calibration step chart. In subsequent iterations, step chart generator 410 generates a step chart based on a threshold array associated with a current uniformity compensated halftone.

In one embodiment, the calibration step chart is printed by the pel forming elements 165 of printer 160, and an image of the calibration step chart is measured by measurement module 190 (e.g., via a scanner). In such an embodiment, measurement module 190 generates print image measurement data, which includes OD data measured for a uniform grid across the web of the print medium for each pel forming element 165.

The calibration step chart typically includes a number of steps (e.g. bars or stripes) of uniform density in which there may be at least one halftone pattern for each color of ink used by the printer. The stripe densities range from paper white (no ink) to maximum density for each ink color. Enough intermediate densities are included to allow interpolation to accurately recover the average measured density corresponding to each color value by interpolation. The steps or bars are arranged so that every segment or portion of the print head prints every color and shade of every color of ink at some point in the chart pattern. Enough pixels are included in the height of the bar so that the random variations in the halftone design are averaged away by averaging measured densities over the bar height. In one embodiment, there is one row in each bar for each row in the halftone threshold array, so that each bar constitutes a complete sample of the halftone design's threshold distribution, and there is no sampling noise included in the measurement due to halftoning of the step chart before printing.

Halftone calibration module 216 also includes OD comparison logic 420 to receive the OD data and determine whether the OD variations for the pel forming elements 165 are less than a predetermined threshold associated with the target uniformity compensation specification. OD variations are differences in the average measured OD values of the printing resulting from one print head nozzle (e.g., pixel) versus measured OD values from one or more other nozzles in response to the same color value input being printed. The uniformity compensation specification comprises a maximum allowable value for these differences or of limits on statistics related to the distribution of differences, such as limits on the mean and standard deviation of the differences. The statistics may include a weighting factor for the OD values wherein the weighting factor is higher for other nozzles that are closer to the one nozzle than other nozzles farther away. In one embodiment, the predetermined threshold is received at halftone calibration module 216 from a system user via a graphical user interface (GUI) 460.

Upon a determination that the variations are less than the pre-determined threshold, OD comparison logic 420 transmits a message indicating that a uniformity compensated halftone has been achieved (e.g., the OD variations are less than the pre-determined threshold). In one embodiment, the message may comprise the uniformity compensated halftone, including threshold values associated with each of the pel forming elements 165. Upon a determination that the variations are greater than the pre-determined threshold, nozzle measurement generation logic 430 generates measurement data associated with each of the pel forming elements 165 (e.g., nozzle measurement data). In this embodiment, the nozzle measurement data comprises an interpolation of the measured OD data. In another embodiment, upon a determination that the OD variations are greater than the pre-determined threshold, OD comparison logic 420 transmits a message indicating that a uniformity compensated halftone has not been achieved (e.g., the OD variations are greater than the pre-determined threshold). Printing System 130 or Print Controller 140 may initiate the generation and printing of a revised calibration step chart upon receiving the message.

Transfer function generation engine 440 generates an inverse transfer function (or ITF) for each of the pel forming elements 165 based on the OD data and a received uniformity compensation target function. In one embodiment, a transfer function comprises a mapping of an input digital count to an output digital count for a system, where digital count is the gray level or color value representing the pels in a bitmap 150 (FIG. 1). Transfer functions may be received or generated (e.g., generated based on target OD versus input digital count data and measured OD versus output digital count data).

An inverse transfer function is the reversed (e.g., inverted) application of the digital count data, where the output digital count values of the transfer function form the input digital count values of the inverse transfer function and the input digital count values of the transfer function form the output digital count values of the inverse transfer function.

Figure 5:
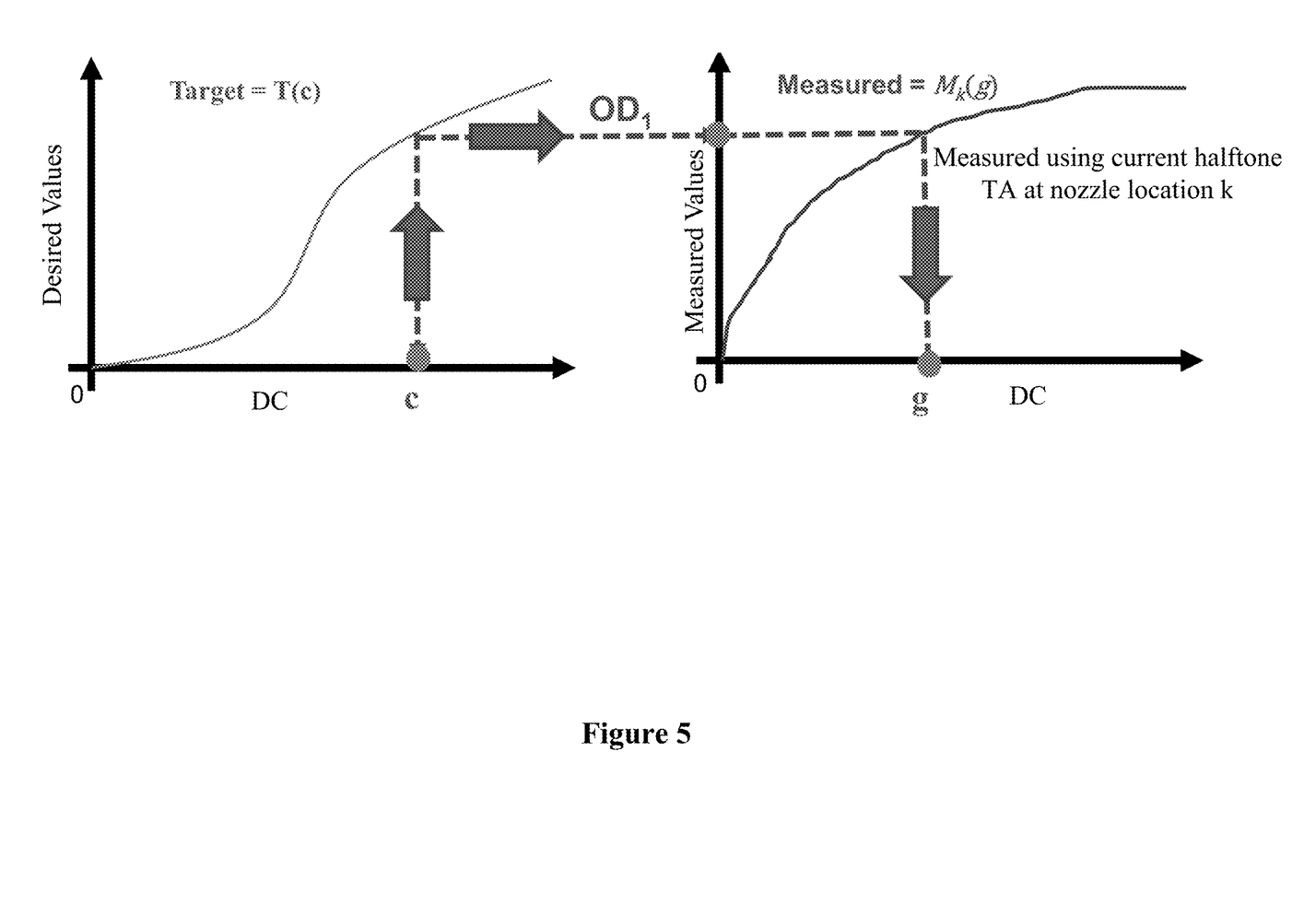
FIG. 5 illustrates one embodiment of an inverse transfer function of a nozzle.

FIG. 5 illustrates one embodiment of an inverse transfer function of a nozzle. As shown in FIG. 5, the inverse transfer function of a pel forming element (e.g., nozzle) is represented as $U_k(g)=c=TF_k^{-1}(g)$. Target OD response T(c) is used as a uniformity objective for all nozzles for a current halftone. Where $\{h_{kl}\}_i$ is the three-dimensional Threshold Array for iteration i, column location k and drop size level l. The Threshold Array includes threshold for all drop sizes. Thresholds for column k are used in the halftoning process to print using nozzle k. Therefore, there is a one to one correspondence between nozzles from the ink jet array to columns of the threshold array. The rows of the threshold array are not included for simplicity. The curly brackets are used to indicate sets of threshold values. It should be understood that the entire threshold array is three dimensional, with rows in the web movement direction, columns corresponding to each nozzle and planes corresponding to each nonzero drop size. In one embodiment, the same target is used for all nozzles to achieve uniform printing. $U_k$ represents the inverse transfer function for nozzle k, which maps color value g to color value c in FIG. 5. $U_k$ may be determined as shown in FIG. 5 by following the dotted line path in the opposite direction of the indicated arrows. In one embodiment, the color values are the Digital Count (DC) levels, which are 0 to 255, for a typical 8-bit printing system.

In such an embodiment, the inverse transfer function of a color value g is the color value c, whose target value T(c) is the measured value $M_k(g)$ that results when the color value g is printed. T(c) may be set the same for all nozzles to provide uniformity between all nozzles. The value $M_k(g)$ is the measured OD at the cross print medium (e.g. web) location corresponding to nozzle k and the current halftone (e.g. threshold array). $U_k$ may be computed directly, rather than by inverting a TF, starting from $M_k(g)$, and then finding $T^{-1}(M_k(g))$. The inverse of the target function $T^{-1}$ may be found by tabulating the target function in two columns having all c and g values, and subsequently swapping the columns. The measured response $M_k(g)$ at nozzle location k may be measured with the entire Threshold Array employed for printing, so as to include contributions from adjacent compensated nozzles. Employing scanned image data, the data is interpolated to obtain the measured response for the nozzle at location k.

As shown in FIG. 5, the Transfer Function TF(c)=g. In one embodiment, the transfer function of color value c is a color value g that, when color value g is printed by the print system, causes the target optical density at color value c to be obtained as the measured value. TF(c) may be determined as shown in FIG. 5 by following the dotted line path in the direction of the indicated arrows. This is because c and g both have the same Optical Density $OD_1$ associated with them. Color c occurring in the target domain and color g in the measured domain systems. The TF(c) may be derived from T(c) and Mk(g) by tabulating the matching color pairs for optical densities as explained here for colors c and g. $U_k$ may then be determined by inverting $TF_k$.

Once the inverse transfer functions have been generated, halftone update engine 450 generates an updated uniformity compensated halftone by modifying all of the thresholds in each column of the threshold array corresponding with the current halftone using the generated inverse transfer function for each respective nozzle. In one embodiment, the inverse transfer function for each column (or nozzle) (k) is used at each iteration to transform the current threshold values $\{h_{kl}\}_{i-1}$ of the compensated halftone from the previous iteration. This creates threshold values for a compensated halftone, $\{h_{kl}\}_i$. This process generates thresholds in the compensated threshold array, based on the corresponding thresholds from the current threshold array.

According to one embodiment, each threshold of the compensated threshold array is determined by using the transformation defined by the corresponding ITF applied to each threshold for all corresponding pels and drop sizes. If the ITF is assumed to be a continuous function, threshold values after transformation may be rounded to integer threshold values. The range of threshold values in the Threshold Arrays created may match the bit depth of image data in the imaging path. Halftones having bit depths higher than that of the imaging path may be employed, by generating down sampled halftones or bit shifting the image data to match the halftone thresholds.

For example, each level (l) of a multi-level halftone represents a drop or dot size, where level l=0 represents no drop or dot. In a web wide halftone, each nozzle/column k of a print head has a set of halftone thresholds for each level l of the multilevel halftone, $\{h_{k,l}\}$. After iteration (i) the uniformity compensated halftone threshold array is: $\{h_{k,l}\}_i = U_{k,i}(U_{k,i-1}(U_{k,1}(\{h_{kl}\}_0) \ldots ))$, where $U_{k,i}$ is the inverse transfer function for nozzle k at iteration i. The uncalibrated initial halftone threshold array is given by $\{h_{kl}\}_0$. This results in convergence towards uniform response in the halftoned image.

In an alternative embodiment, transfer functions may be implemented to apply directly to image data. In this case the uncalibrated halftone is not modified. Instead, the image data is transformed prior to halftoning. In this embodiment, transfer function generation engine 440 generates a transfer function for each nozzle, rather than inverse transfer functions, while halftone update engine 450 modifies the transfer function for each nozzle, by applying the current transfer function to it, to generate the current cumulative transfer function. It is important to distinguish between the cumulative transfer function determined in this way:

$$TFC_i(c) = TF_i(TF_{i-1}( \ldots TFi(c) \ldots ))$$

from the current transfer function at iteration i, $TF_i(c)$. The cumulative transfer function is, in other words, the composition of transfer functions determined by measurement at each iteration, i. Additionally, this embodiment includes step chart generator 410 generating a calibration step chart using the halftone (e.g., threshold array) and transfer function applied to the image data.

In one embodiment, the same uncalibrated halftone is employed for printing in this embodiment and only the cumulative transfer function is recomputed to obtain the current cumulative transfer function after iteration i. Assuming the cumulative transfer function is $TFC_{k,i}$ for nozzle k after iteration i, the current cumulative transfer function for all nozzles is $$TFC_{k,i} = TF_{k,i}(TF_{k,i-1}( \ldots (TF_{k,1}) \ldots ))$$

where $TF_{k,i}$ is the transfer function for nozzle k, as measured after iteration i. An initial transfer function $TF_{k,0}$ is used, which typically is the identity transfer function. In another embodiment an initial transfer function derived based on engine calibration might be used. This results in convergence towards uniform response in the uniformity compensated halftoned image, employing cascaded transfer functions instead of uniformity calibrated halftones.

Figure 6:
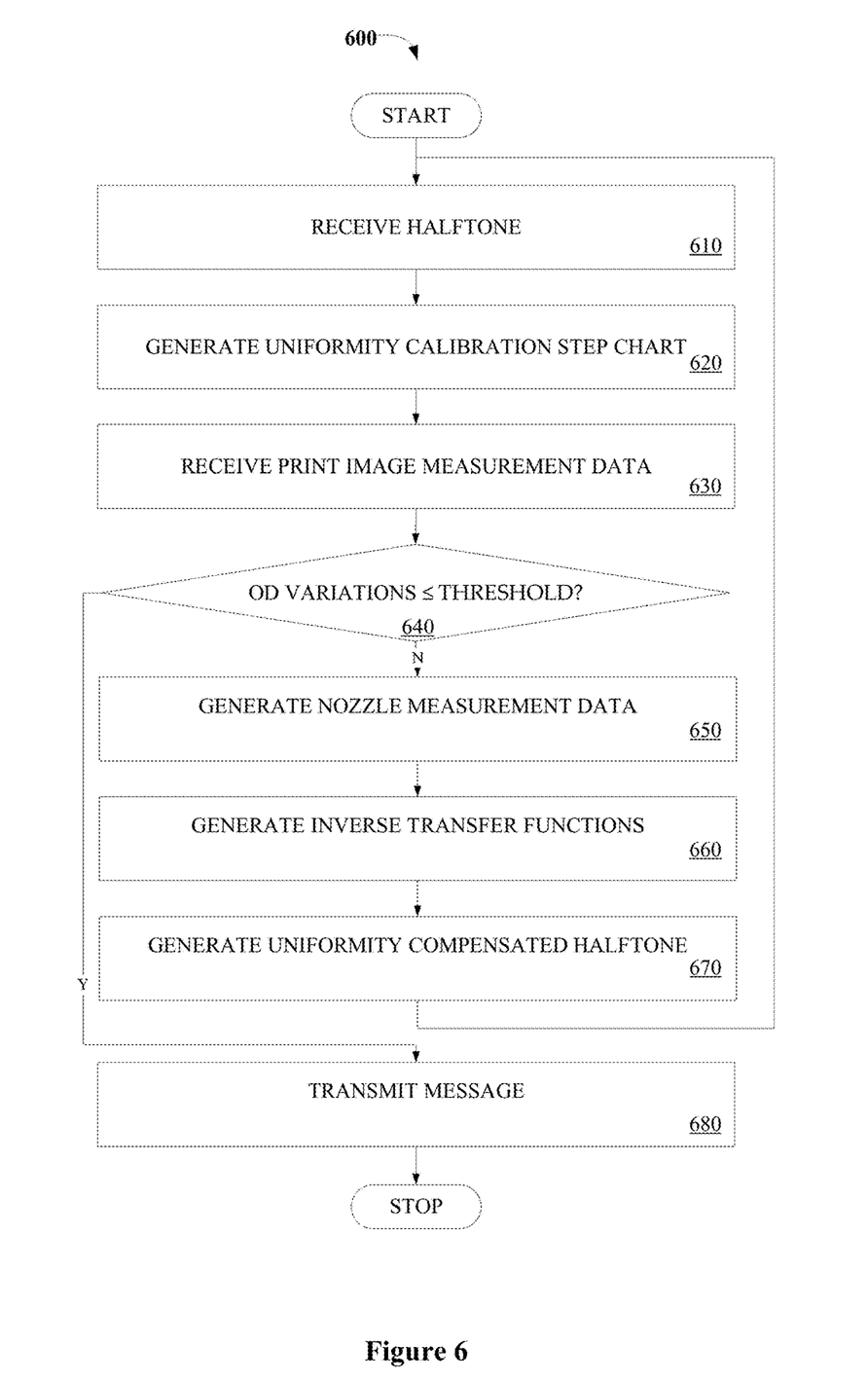
FIG. 6 is a flow diagram illustrating one embodiment of a uniformity compensation process performed by a printing system.

FIG. 6 is a flow diagram illustrating one embodiment of a process 600 for performing uniformity compensation. Process 600 may be performed by processing logic that may include hardware (e.g., circuitry, dedicated logic, programmable logic, microcode, etc.), software such as instructions run on a processing device, or a combination thereof. In one embodiment, process 600 is performed by halftone calibration module 216.

At processing block 610, a halftone is received. In the first iteration of the process, the halftone is an uncalibrated halftone. At processing block 620, a uniformity calibration step chart is generated. This chart may have cross web stripes having the same tint level, ranging from zero to 100% tint levels in multiple steps. At processing block 630, the uniformity calibration chart is printed and print image measurement data from measuring the chart, including the OD measurement data, is received. At decision block 640, a determination is made as to whether OD variations are less than or equal to the predetermined threshold. If so, a message is transmitted indicating that a uniformity compensated halftone has been achieved, processing block 680. As discussed above, the message may include uniformity compensated halftone values. In some embodiments, a message may also be transmitted indicating that the variations are greater than the pre-determined threshold (e.g., indicating that another iteration is to be performed).

At processing block 650, nozzle measurement data is generated upon a determination that the OD variations are greater than the predetermined threshold. As discussed above, the nozzle measurement data may be generated by interpolating the OD measurement data. At processing block 660, inverse transfer functions are generated for each nozzle to achieve the target OD response for each nozzle.

At processing block 670, a uniformity compensated halftone is generated by modifying the thresholds in each column of the threshold array using the inverse transfer function for each nozzle. By performing these steps on a per nozzle basis, improved uniformity compensation (e.g., more accurate, faster, less operator burden, etc.) over conventional methods may be achieved. In one embodiment, a uniformity compensated halftone is generated for each drop size of the halftone design, which produces the current threshold array which is employed for printing or printing the uniformity calibration step chart. In another embodiment, at processing block 670, the uniformity compensated halftone for each of the pel forming elements is transmitted. In yet another embodiment, at processing block 670 a message is transmitted indicating that the uniformity compensated halftone has not been achieved (e.g., request revised print image measurement data corresponding to printing a revised uniformity calibration step chart with the revised uniformity compensated halftones).

Subsequently, control is returned to processing block 610, where the uniformity compensated halftone is received as an updated halftone. This loop is repeated for as many iterations that are needed to satisfy the condition of decision block 640. When a threshold array is generated which satisfies the OD variation criteria it may be used for all subsequent printing. The uniformity compensated threshold arrays may be saved with the current conditions, such as the paper type. Subsequent printing, using the same paper type, may employ the saved uniformity compensated threshold array.

Figure 7:
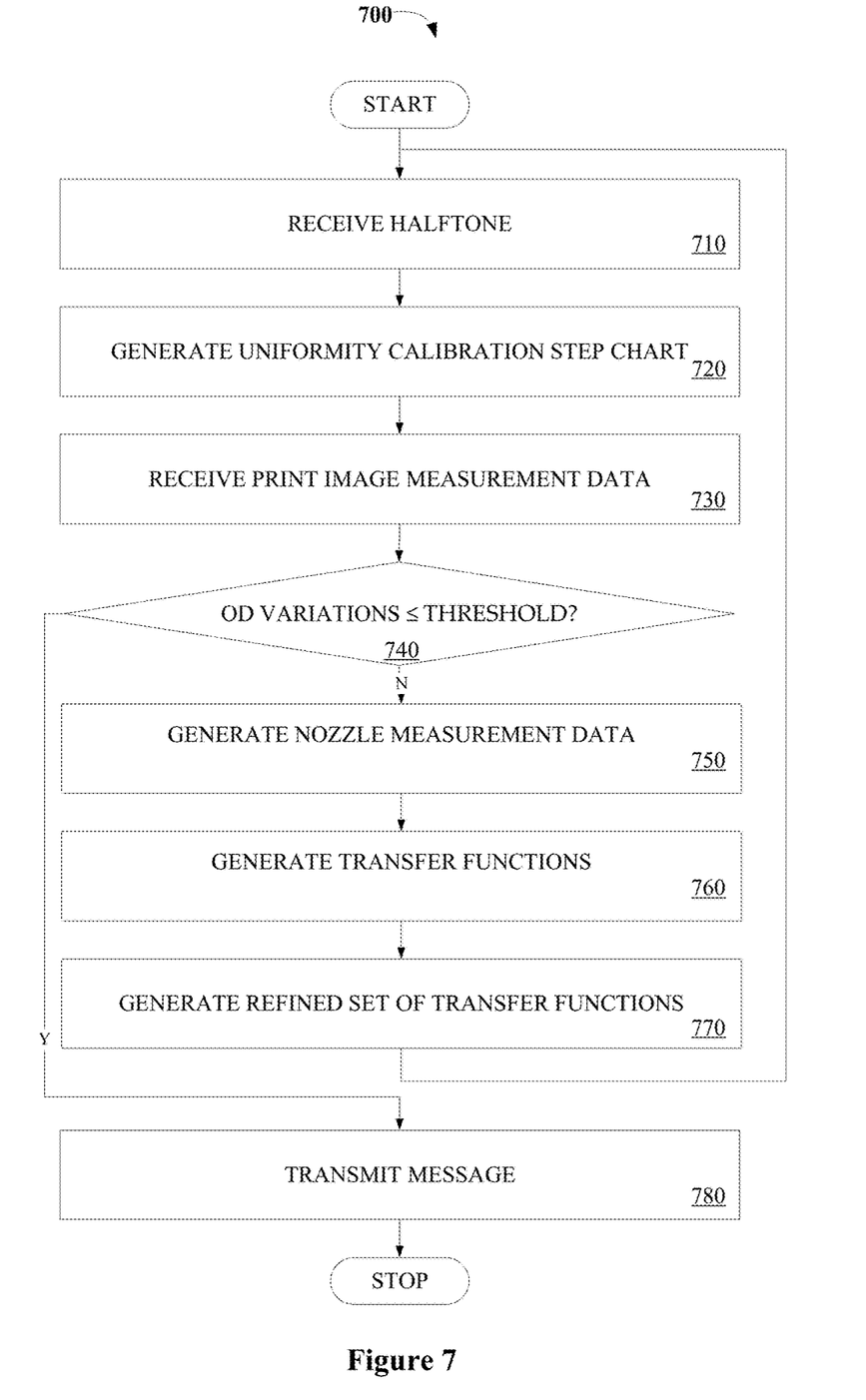
FIG. 7 is a flow diagram illustrating another embodiment of a uniformity compensation process performed by a printing system.

FIG. 7 is a flow diagram illustrating another process 700 for performing uniformity compensation. In this process transfer functions for each nozzle based on a cascaded process are employed. Process 700 may be performed by processing logic that may include hardware (e.g., circuitry, dedicated logic, programmable logic, microcode, etc.), software such as instructions run on a processing device, or a combination thereof. In one embodiment, process 700 is performed by halftone calibration module 216.

At processing block 710, a halftone is received. At processing block 720, a uniformity calibration step chart is generated. At processing block 730, the uniformity calibration chart is printed and print image measurement data from measuring the chart, including the OD measurement data, is received. At decision block 740, a determination is made as to whether OD variations are less than or equal to the predetermined threshold. If so, a message is transmitted indicating that a uniformity compensated set of transfer functions has been obtained, processing block 780.

However, nozzle measurement data is generated upon a determination that the OD variations are greater than the predetermined threshold, processing block 750. At processing block 760, transfer functions are generated for each nozzle. At processing block 770, a refined set of cumulative transfer function (cascaded single iteration transfer functions) are generated by modifying the previous transfer function sets for the nozzles. In another embodiment, the refined set of cumulative transfer functions are transmitted. Subsequently, control is returned to processing block 610, where the process is repeated. Once a refined set of cumulative transfer functions has been generated that satisfies the OD variation criteria, the cumulative transfer functions may be used for all subsequent printing. The uniformity compensated set of cumulative transfer functions may be saved with the current conditions, such as the paper type. Subsequent printing, using the same paper type, will may utilize the saved sets of refined cumulative transfer functions.

Note that the cascaded refined cumulative transfer function approach described may be employed in printing systems that do not have point operation halftoning, using threshold arrays. The described uniformity system, employing a refined set of cascaded transfer functions, can be employed in printers having neighborhood halftoning implemented, such as error diffusion.

Although shown as a component of print controller 140, other embodiments may feature halftone calibration module 216 included within an independent device, or combination of devices, communicably coupled to print controller 140. For instance, FIG. 8 illustrates one embodiment of a halftone calibration module 216 implemented in a network 800.

Figure 8:
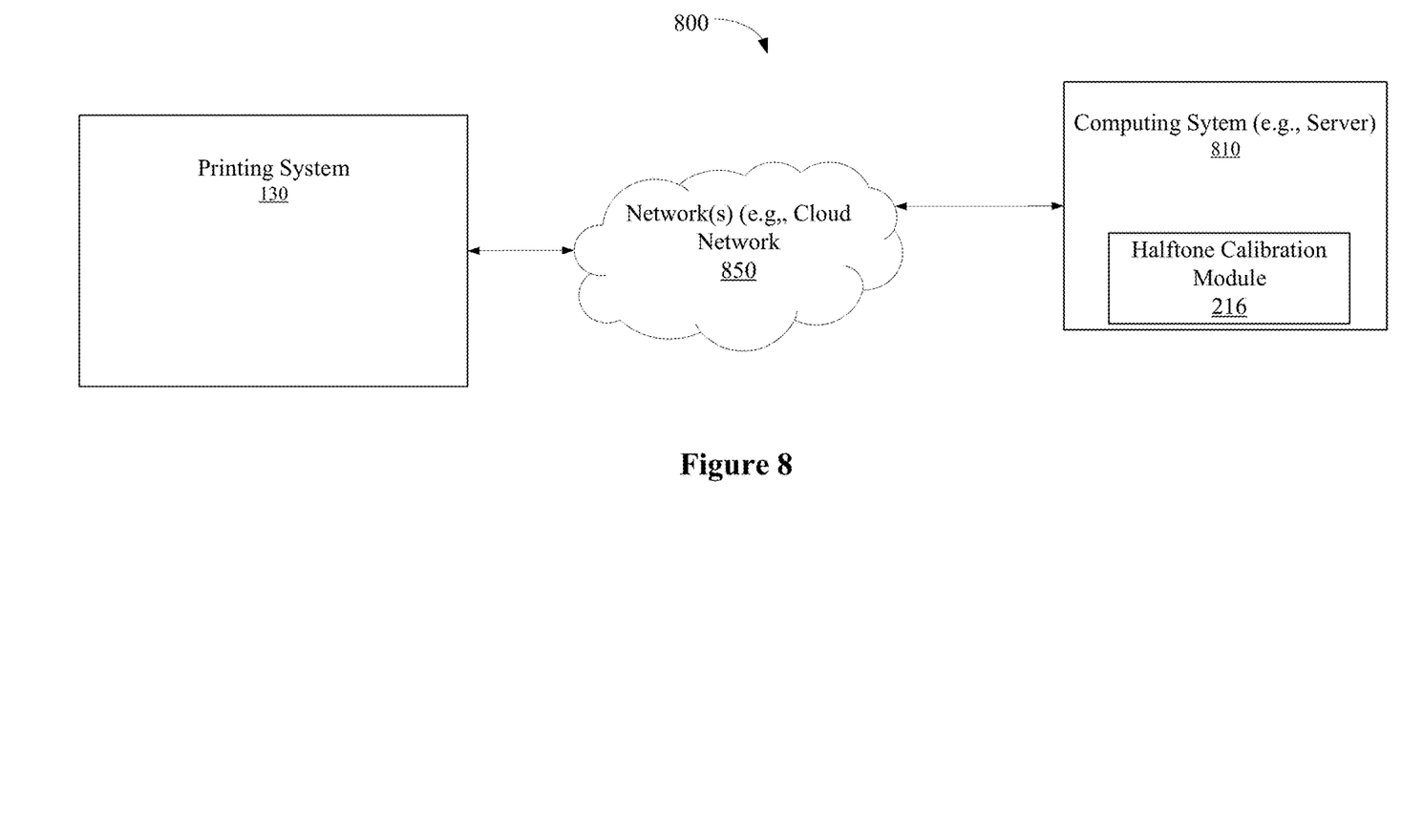
FIG. 8 illustrates one embodiment of a halftone calibration module implemented in a network.

As shown in FIG. 8, halftone calibration module 216 is included within a computing system 810 and transmits calibrated halftones 220 to printing system 130 via a cloud network 850. Printing system 130 receives calibrated halftones 220. In this embodiment, processing blocks 630-680 (and 730-780) may be performed at computing system 810, while processing blocks 610 and 620 (and 710 and 720) may be performed at printing system 130.

Figure 9:
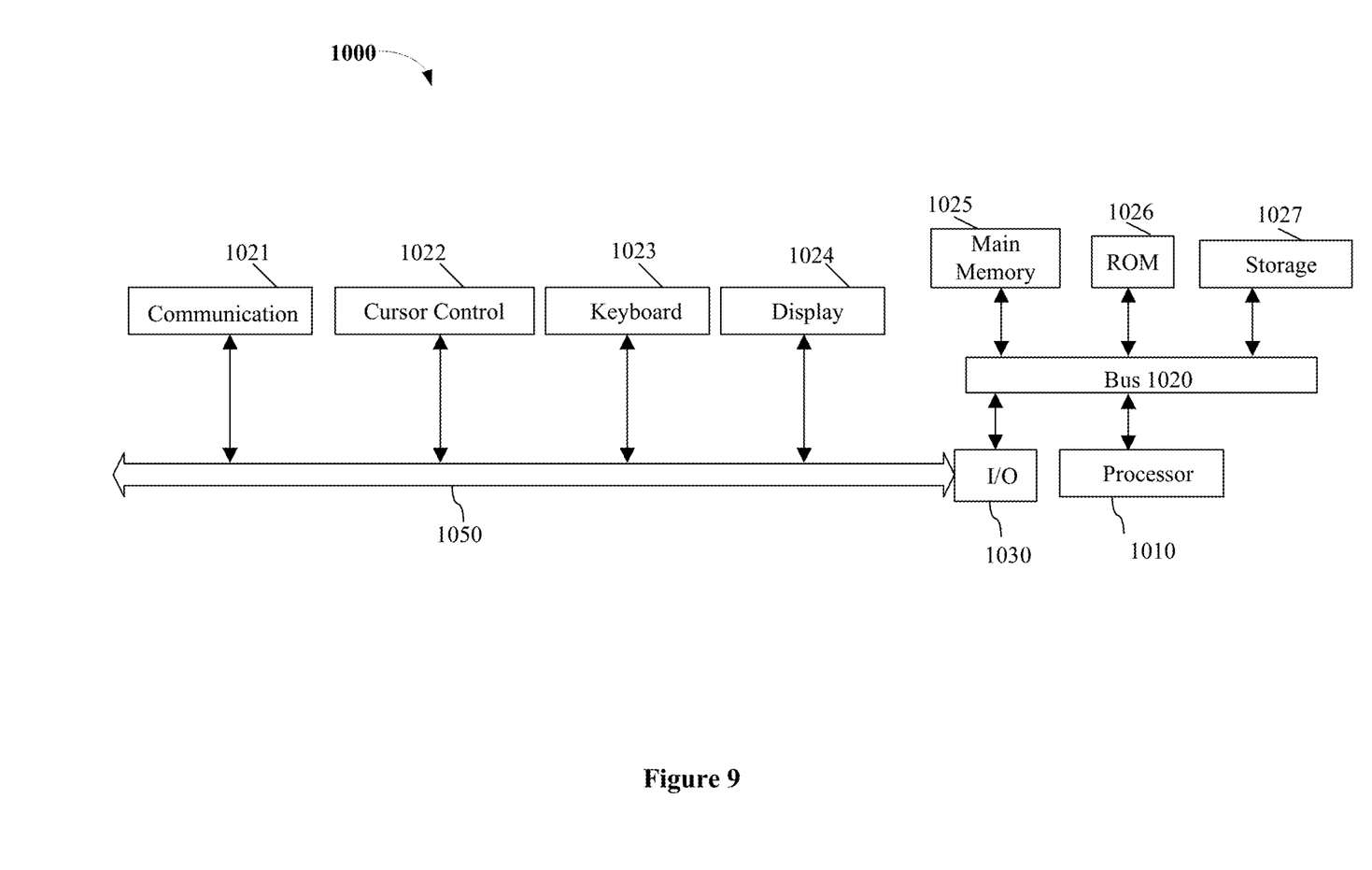
FIG. 9 illustrates one embodiment of a computer system.

FIG. 9 illustrates a computer system 1000 on which printing system 130 and/or halftone calibration module 216 may be implemented. Computer system 1000 includes a system bus 1020 for communicating information, and a processor 1010 coupled to bus 1020 for processing information.

Computer system 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Computer system 1000 also may include a read only memory (ROM) and or other static storage device 1026 coupled to bus 1020 for storing static information and instructions used by processor 1010.

A data storage device 1027 such as a magnetic disk or optical disc and its corresponding drive may also be coupled to computer system 1000 for storing information and instructions. Computer system 1000 can also be coupled to a second I/O bus 1050 via an I/O interface 1030. A plurality of I/O devices may be coupled to I/O bus 1050, including a display device 1024, an input device (e.g., an alphanumeric input device 1023 and or a cursor control device 1022). The communication device 1021 is for accessing other computers (servers or clients). The communication device 1021 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store halftone calibration logic; and one or more processors coupled with the at least one physical memory device to execute the halftone calibration logic to receive print image measurement data corresponding to a first halftone design associated with each of a plurality of pel forming elements, generate measurement data for each of the pel forming elements based on the print image measurement data, generate a uniformity compensated halftone for each of the pel forming elements based on inverse transfer functions corresponding to each of the pel forming elements and the first halftone design and transmit the uniformity compensated halftone for each of the pel forming elements.

Example 2 includes the subject matter of Example 1, wherein the print image measurement data comprises optical density data associated with each of the pel forming elements.

Example 3 includes the subject matter of Examples 1 and 2, wherein the halftone calibration logic further determines whether variations in the optical density data for each of the pel forming elements are greater than a predetermined threshold, transmits a message indicating that the variations are greater than the pre-determined threshold upon determining that the variations are greater than a pre-determined threshold and transmits a message indicating that the variations are less than the pre-determined threshold upon determining that the variations are less than the pre-determined threshold.

Example 4 includes the subject matter of Examples 1-3, wherein the halftone calibration logic further generates the inverse transfer functions for each of the pel forming elements based on the measurement data for each of the pel forming elements and a uniformity compensation target.

Example 5 includes the subject matter of Examples 1-4, wherein the measurement data for each of the pel forming elements is generated by performing an interpolation on the optical density data.

Example 6 includes the subject matter of Examples 1-5, wherein the halftone calibration logic generates a calibration step chart using a first threshold array associated with the first halftone design.

Example 7 includes the subject matter of Examples 1-6, wherein the uniformity compensated halftone is generated by modifying the first threshold array using the inverse transfer function associated with each of the pel forming elements.

Example 8 includes the subject matter of Examples 1-7, wherein the halftone calibration logic further generates second inverse transfer functions associated with each of the pel forming elements based on a second measurement data for each of the pel forming elements and a uniformity compensation target and generates a second uniformity compensated halftone based on the first and second inverse transfer functions.

Example 9 includes the subject matter of Examples 1-8, wherein the uniformity compensated halftone is generated by modifying the first inverse transfer functions using the second inverse transfer functions associated with each of the pel forming elements.

Example 10 includes the subject matter of Examples 1-9, wherein the halftone calibration logic generates a second calibration step chart based on the uniformity compensated halftone associated with each of the plurality of pel forming elements.

Example 11 includes the subject matter of Examples 1-10, further comprising a print engine to receive the uniformity compensated halftone and print the print image measurement data.

Some embodiments pertain to Example 12 that includes at least one computer readable medium having instructions stored thereon, which when executed by one or more processors, cause the processors to receive print image measurement data corresponding to a first halftone design associated with each of a plurality of pel forming elements, generate measurement data for each of the pel forming elements based on the print image measurement data, generate a uniformity compensated halftone for each of the pel forming elements based on inverse transfer functions corresponding to each of the pel forming elements and the first halftone design and transmit the uniformity compensated halftone for each of the pel forming elements.

Example 13 includes the subject matter of Example 12, wherein the print image measurement data comprises optical density data associated with each of the pel forming elements.

Example 14 includes the subject matter of Examples 12 and 13, having instructions stored thereon, which when executed by one or more processors, further cause the processors to determine whether variations in the optical density data for each of the pel forming elements are greater than a predetermined threshold, transmit a message indicating that the variations are greater than the pre-determined threshold upon determining that the variations are greater than a pre-determined threshold and transmit a message indicating that the variations are less than the pre-determined threshold upon determining that the variations are less than the pre-determined threshold Example 15 includes the subject matter of Examples 12-14, having instructions stored thereon, which when executed by one or more processors, further cause the processors to generate the inverse transfer functions for each of the pel forming elements based on the measurement data for each of the pel forming elements and a uniformity compensation target.

Example 16 includes the subject matter of Examples 12-15, wherein the measurement data for each of the pel forming elements is generated by performing an interpolation on the optical density data.

Some embodiments pertain to Example 17 that includes a method comprising receiving print image measurement data corresponding to a first halftone design associated with each of a plurality of pel forming elements, generating measurement data for each of the pel forming elements based on the print image measurement data, generating a uniformity compensated halftone for each of the pel forming elements based on inverse transfer functions corresponding to each of the pel forming elements and the first halftone design, and transmitting the uniformity compensated halftone for each of the pel forming elements.

Example 18 includes the subject matter of Example 17, wherein the print image measurement data comprises optical density data associated with each of the pel forming elements.

Example 19 includes the subject matter of Examples 17 and 18, further comprising determining whether variations in the optical density data for each of the pel forming elements are greater than a predetermined threshold, transmitting a message indicating that the variations are greater than the pre-determined threshold upon determining that the variations are greater than a pre-determined threshold and transmitting a message indicating that the variations are less than the pre-determined threshold upon determining that the variations are less than the pre-determined threshold.

Example 20 includes the subject matter of Examples 17-19, further comprising generating the inverse transfer functions for each of the pel forming elements based on the measurement data for each of the pel forming elements and a uniformity compensation target.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:
1. A system comprising:
at least one physical memory device to store calibration logic; and
one or more processors coupled with the at least one physical memory device to execute the calibration logic to:
receive print image measurement data corresponding to a first set of transfer functions associated with each of a plurality of pel forming elements;

generate measurement data for each of the pel forming elements based on the print image measurement data;

generate a second set of transfer functions associated with each of the pel forming elements; and apply the second transfer functions to the first transfer functions to generate cumulative transfer functions, wherein the cumulative transfer functions are applied to image data to print an image to a print medium.

2. The system of claim 1, wherein the print image measurement data comprises optical density data associated with each of the pel forming elements.

3. The system of claim 1, wherein the calibration logic further transmits a message to the printing system indicating that variations in the measurement data are less than a pre-determined threshold upon determining that the variations in the measurement data are less than the pre-determined threshold.

4. The system of claim 1, wherein the calibration logic generates the second set of transfer functions as a set of cascaded transfer functions.

5. The system of claim 2, wherein the measurement data for each of the pel forming elements is generated by performing an interpolation on the optical density data.

6. The system of claim 1, wherein the calibration logic further generates a first calibration step chart based on the first set of transfer functions.

7. The system of claim 4, wherein the set of cascaded transfer functions are generated by modifying the first set of transfer functions.

8. The system of claim 1, wherein the calibration logic further generates a third set of transfer functions associated with each of the pel forming elements based on a second measurement data for each of the pel forming elements and target data for each of the pel forming elements.

9. The system of claim 1, wherein the target data is used for each of the pel forming elements to achieve uniform optical density printing.

10. The system of claim 6, wherein the calibration logic further generates a second calibration step chart based on the second set of transfer functions.

11. The system of claim 1, further comprising a print engine to receive the cumulative transfer functions from the calibration logic and apply the cumulative transfer functions to the image data.

12. At least one non-transitory computer readable medium having instructions stored thereon, which when executed by one or more processors, cause the processors to:

receive print image measurement data corresponding to a first set of transfer functions associated with each of a plurality of pel forming elements;

generate measurement data for each of the pel forming elements based on the print image measurement data; and generate a second set of transfer functions associated with each of the pel forming elements; and apply the second transfer functions to the first transfer functions to generate cumulative transfer functions, wherein the cumulative transfer functions are applied to image data to print an image to a print medium.

13. The computer readable medium of claim 12, wherein the print image measurement data comprises optical density data associated with each of the pel forming elements.

14. The computer readable medium of claim 12, having instructions stored thereon, which when executed by one or more processors, further cause the processors to transmit a message to the printing system indicating that variations in the measurement data are less than a pre-determined threshold upon determining that the variations in the measurement data are less than the pre-determined threshold.

15. The computer readable medium of claim 12, having instructions stored thereon, which when executed by one or more processors, further cause the processors to generate the second set of transfer functions as a set of cascaded transfer functions.

16. The computer readable medium of claim 13, wherein the measurement data for each of the pel forming elements is generated by performing an interpolation on the optical density data.

17. A method comprising:

receiving print image measurement data corresponding to a first set of transfer functions associated with each of a plurality of pel forming elements;

generating measurement data for each of the pel forming elements based on the print image measurement data; and generating a second set of transfer functions associated with each of the pel forming elements; and applying the second transfer functions to the first transfer functions to generate cumulative transfer functions, wherein the cumulative transfer functions are applied to image data to print an image to a print medium.

18. The method of claim 17, wherein the print image measurement data comprises optical density data associated with each of the pel forming elements.

19. The method of claim 17, further comprising transmitting a message to the printing system indicating that variations in the measurement data are less than a pre-determined threshold upon determining that the variations in the measurement data are less than the pre-determined threshold.

20. The method of claim 17, further comprising generating the second set of transfer functions as a set of cascaded transfer functions.

* * * * *